United States Patent
Brogan et al.

(10) Patent No.: US 10,033,293 B2
(45) Date of Patent: Jul. 24, 2018

(54) CONTROL METHOD FOR SELF-COMMUTATED CONVERTER FOR CONTROLLING POWER EXCHANGE

(71) Applicant: SIEMENS AKTIENGESELLCHAFT, Munich (DE)

(72) Inventors: Paul Brian Brogan, Glasgow (GB); Rodney Jones, Stoke on Trent (GB); Peter Menke, Oberfuellbach (DE); Rainer Zurowski, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 288 days.

(21) Appl. No.: 14/913,182

(22) PCT Filed: Aug. 19, 2013

(86) PCT No.: PCT/EP2013/067248
§ 371 (c)(1),
(2) Date: Feb. 19, 2016

(87) PCT Pub. No.: WO2015/024583
PCT Pub. Date: Feb. 26, 2015

(65) Prior Publication Data
US 2016/0204612 A1    Jul. 14, 2016

(51) Int. Cl.
*H02M 5/458* (2006.01)
*H02M 7/04* (2006.01)
(Continued)

(52) U.S. Cl.
CPC .......... *H02M 5/4585* (2013.01); *H02M 7/04* (2013.01); *H02M 7/44* (2013.01);
(Continued)

(58) Field of Classification Search
CPC ............ H02J 3/386; H02M 7/04; H02M 7/44; H02M 5/4585; H02M 7/53871
See application file for complete search history.

(56) References Cited

U.S. PATENT DOCUMENTS

| 6,025,701 A | 2/2000 | Weinhold |
| 6,674,267 B2 * | 1/2004 | Wernersson ......... H02J 3/1821 323/207 |

(Continued)

FOREIGN PATENT DOCUMENTS

| CN | 1181160 A | 5/1998 |
| EP | 0449687 A | 10/1991 |

OTHER PUBLICATIONS

Joan Rocabert et al.: "Control of Power Converters in AC Microgrids"; IEEE Transactions on Power Electronics; vol. 27 No. 11; pp. 4734-4749; Nov. 2012; XP011454774.

(Continued)

*Primary Examiner* — Emily P Pham
(74) *Attorney, Agent, or Firm* — Laurence Greenberg; Werner Stemer; Ralph Locher

(57) ABSTRACT

A self-commutated converter is connected to further self-commutated converters by its AC voltage connection via an inductive component using a coupling point, which is common to all the converters, in an AC voltage network. An active power P and a frequency $f_N$ are determined from a network voltage $\underline{u}_{VP}$ at the coupling point and a converter current $\underline{i}_{RE}$ flowing via the inductive component. An active power difference value $\Delta P$ is supplied to an orthogonal controller and to a parallel controller. The output value from the parallel controller is used to minimize the reactive power exchanged between converter and coupling point. The frequency difference value $\Delta f$ is supplied to a frequency controller and the output value from the frequency controller (Continued)

is logically combined with the output value from the orthogonal controller and the output value from the parallel controller, the frequency difference value Δf being simultaneously minimized.

17 Claims, 4 Drawing Sheets

(51) Int. Cl.
    *H02M 7/44*     (2006.01)
    *H02M 7/5387*     (2007.01)
    *H02J 3/38*     (2006.01)
    *H02M 7/539*     (2006.01)

(52) U.S. Cl.
    CPC ......... *H02M 7/53871* (2013.01); *H02J 3/386* (2013.01); *H02M 7/539* (2013.01); *Y02E 10/763* (2013.01)

(56) References Cited

U.S. PATENT DOCUMENTS

| | | | |
|---|---|---|---|
| 6,737,837 B1 * | 5/2004 | Halvarsson | G05F 1/70 |
| | | | 323/205 |
| 7,659,637 B2 * | 2/2010 | Ichinose | F03D 7/0224 |
| | | | 290/44 |
| 9,812,872 B2 * | 11/2017 | Benesch | H02J 4/00 |

OTHER PUBLICATIONS

Blasco-Gimenez R et al.: "Distributed Voltage and Frequency Control of Offshore Wind Farms Connected with a Diode-Based HVdc Link", IEEE Transactions on Power Electronics, IEEE Service Center, Piscataway, NJ, US, vol. 25, No. 12, Dec. 1, 2010 (Dec. 1, 2010), pp. 3095-3105, XP011343844, ISSN: 08858993.

* cited by examiner

CONTROL METHOD FOR SELF-COMMUTATED CONVERTER FOR CONTROLLING POWER EXCHANGE

BACKGROUND OF THE INVENTION

Field of the Invention

The invention relates to a method for controlling a self-commutated converter, that is connected to further self-commutated converters through its alternating current terminal via an inductive component at a coupling point of an alternating current network that is common to all converters, with a nominal frequency of $f_N$.

The invention relates further to a self-commutated converter for transmitting a power with an alternating current terminal for connecting an alternating current network, a direct current terminal for connecting a direct current network and a control unit, which is connected via control lines to power semiconductor switches that can be switched on and off and which is designed to adjust the transmission of the power with the aid of a method mentioned at the beginning.

The invention further relates to a wind farm with a large number of wind turbines, wherein each wind turbine comprises such a self-commutated converter.

Such a method, such a self-commutated converter and such a wind farm are already known from the article by R. Blasco-Gimenez et al., Universidad Polytéchnica de Valencia, entitled "Distributed Voltage and Frequency Control of Off-shore Wind Farms Connected with a Diode Based HVDC link". The said self-commutated converter is connected via an intermediate direct current circuit to a further converter that acts as a rectifier and for its part is connected on its alternating current side with the synchronous generator of a wind turbine. In contrast to the usual control method, it is proposed that the voltage is adjusted with the aid of the active current, and the frequency of the connected alternating current network adjusted with the set reactive current. Current regulation is proposed as the control method, wherein the set point values for the active and reactive current are ascertained and are each compared with the measured converter currents through the formation of difference values. The respective difference value is supplied to a controller which ensures appropriate drive of the self-commutated converter. The set point values for the active and reactive currents are ascertained with the aid of controllers on the basis of central and non-central measurements.

BRIEF SUMMARY OF THE INVENTION

The object of the invention is to provide a method of the type mentioned at the beginning that can easily be applied in practice and that is as simple to construct as possible.

The invention achieves this object through a method for controlling a self-commutated converter, that is connected to further self-commutated converters through its alternating current terminal via an inductive component at a coupling point of an alternating current network that is common to all converters, in which an active power P and a frequency $f_N$ are determined from a network voltage $\underline{u}_{VP}$ ascertained at the coupling point and a converter current $\underline{i}_{Kr}$ ascertained flowing through the inductive component, the difference between the active power P and a specified set point active power $P_{Soll}$ is formed so obtaining an active power difference value $\Delta P$ and the difference between the frequency $f_N$ and a specified set point frequency $F_{Soll}$ is formed so obtaining a frequency difference value $\Delta f$, wherein the active power difference value $\Delta P$ is supplied to both an orthogonal controller and a parallel controller, and wherein the active power P is determined with the output value of the orthogonal controller the reactive power exchanged between the converter and the coupling point is minimized with the output value of the parallel controller, wherein the frequency difference value $\Delta f$ is supplied to a frequency controller, and the output value of the frequency controller is combined with the output value of the orthogonal controller and the output value of the parallel controller, wherein the frequency difference value $\Delta f$ is minimized at the same time.

With the aid of the method according to the invention, a self-commutated converter for the transmission of a power, which can be connected at its alternating current terminal via an inductive component to a high-voltage AC electrical network, can be controlled. The term "power" here refers to an apparent power that comprises both active and reactive power. In order for the method in the context of the invention to be utilized to practical advantage, the connected high-voltage AC electrical network should be a weak high-voltage AC network that can even exhibit a short circuit power ratio less than 2. Such a high-voltage AC electrical network can, in principle, have any desired configuration in the context of the invention. It is thus, for example, possible that the alternating current network is connected to a stiff supply network via a direct current connection. The direct current connection advantageously comprises a diode rectifier that is connected via a direct current network to a further converter which is connected to the power supply network. This converter is, for example, a self-commutated converter, such as what is known as a Voltage Source Converter (VSC). As an alternative to a diode rectifier, an externally commutated converter that comprises thyristors as power semiconductor switches can also be connected to the alternating current network. The externally commutated converter is then connected instead of to the diode rectifier to a VSC via a high-voltage DC electrical network, e.g. an intermediate direct current circuit.

The different self-commutated converters are connected, in the context of the invention as control units to a weak alternating current network. The alternating current network is, for example, connected to a diode rectifier or to an externally commutated converter. The said alternating current network is here designed for high voltages. It has, for example, no energy source of its own, and can at best be supplied to a limited extent with energy from outside through an auxiliary supply line.

The short circuit power $S_k$, which is calculated from the product of the short circuit current $I_k$, the rated current $U_n$ and a chaining factor $\sqrt{3}$ according to the formula $S_k = U_n * I_k * \sqrt{3}$, is used by the expert as a measure for a stiff or weak alternating current network. If the said short circuit power in a self-commutated converter is related to the rated active power $P_{DC}$ provided on the DC side, the "Short Circuit Ratio" is obtained according to $$SCR = \frac{S_k}{P_{DC}}.$$

In the context of the invention, the said short circuit power ratio can, in the lower limit range, be less than 2 for any control unit, that is to say for any self-commutated converter that is controlled with the method according to the invention. A weak alternating current network, such as for example occurs when coupling offshore wind farms to an onshore power supply network, can thus be involved.

In the context of the invention a method is therefore provided in which the converters of the wind turbines of a wind farm automatically build an alternating current network with the desired amplitude and network frequency, through which the wind farm is connected, for example, with the said diode rectifier or with the said externally commutated converter. Every self-commutated converter is here connected via an inductive component to a coupling point that is common to all the converters ("Point of Common Coupling") of the said alternating current network. Each self-commutated converter that is controlled with the aid of the method according to the invention is, for example, arranged in the nacelle of the respective wind turbine. An externally commutated converter is, for example, a converter that is fitted with thyristor valves. An inductance is, for example, a transformer, a choke, a coil or another inductive component.

In the context of the invention, the network voltage $U_{VP}$ at the point of common coupling of the alternating current network is first acquired. The said alternating current is ascertained as a space-vector $\underline{u}_{VP}$ with the aid of measuring instruments and signal processing means, wherein such a space-vector is indicated below by an arrow arranged under the respective magnitude. Complex magnitudes are underlined. The index 1 is intended to indicate that a fundamental oscillation magnitude is referred to. The index + and the index − indicate the positive sequence and the negative sequence respectively. The indices ∥ and ⊥ indicate that these complex amplitudes are oriented in the same direction as or perpendicular to the space-vector of the positive-sequence fundamental oscillation of the network voltage at coupling point $\underline{u}_{VP}$. The output magnitudes of the controllers applied in the context of the invention are simple magnitudes. A complex magnitude with superscripted stars is intended to refer to conjugated complex magnitudes.

In the context of the invention, in addition to the space-vector of the network voltage $\underline{u}_{VP}$ the converter current is also ascertained, wherein here again a current space-vector $\underline{i}_{RE}$ is calculated from the measured converter current values. Set point magnitudes in the form of a set point active power $P_{Soll}$ and a set point frequency $F_{Soll}$ as input magnitudes are, furthermore, specified to the controller. The set point values can, for example, be specified by a central control unit, such as for example a wind farm pilot. Additionally, however, it is for example possible for each wind turbine to comprise functional units for the appropriate generation of the said set point values. An active power P that is exchanged via the inductive component with the weak alternating current network can be determined with the aid of the network voltage $\underline{u}_{VP}$ ascertained at the coupling point and the converter current $\underline{i}_{RE}$ flowing through the inductive component. This actual active power is compared with the specified set point active power $P_{Soll}$. The active power difference ΔP yielded by this comparison is supplied in the context of the invention both to an orthogonal controller and to a parallel controller. The output signal from the orthogonal controller corresponds to a value which, in turn, corresponds to the magnitude of a voltage space-vector which is oriented perpendicular to the voltage space-vector of the alternating current network at the coupling point. The active power exchanged is thus substantially determined from this output value of the orthogonal controller. This is owing to the inductive coupling of the self-commutated converter to the alternating current network. In the context of the invention, the output value of the parallel controller minimizes the reactive power exchanged. A frequency controller is further provided according to the invention, whose purpose is to ensure that the voltage provided by the self-commutated converter at its alternating current terminal also stabilizes the frequency of the network voltage at the coupling point.

A direct current controller is omitted according to the invention. This permits a stable operation of an electrical alternating current network that exhibits a very high or a non-linear network impedance and which, moreover, does not have its own energy source. In the context of the invention, the reactive power of the control unit is not directly controlled, and thus represents a degree of freedom in the system.

Advantageously a pre-control value is added to the output value of the orthogonal controller and/or the output value of the parallel controller and/or the output value of the frequency controller thus obtaining an orthogonal pre-control regulator addition value of a parallel pre-control regulator addition value and/or a frequency pre-control regulator addition value. The dynamic behavior of the control is significantly improved through the pre-control.

According to an expedient further development of the invention in this respect, the orthogonal pre-control regulator addition value multiplied by j and the parallel pre-control regulator addition value are combined with one another additively, wherein both an amplitude |z| and a preliminary frequency of a converter voltage $\underline{u}_{RE}$ are ascertained from the additive combination, corresponding to a converter voltage $\underline{u}_{RE}$ that provides for a transmission of an active power that corresponds as closely as possible to the set point active power and, at the same time, minimizes the reactive power.

According to another further development in this respect, the frequency pre-control regulator addition value is combined additively with the pre-frequency component, so obtaining the frequency of the converter voltage that is to be set.

Advantageously, the frequency pre-control regulator addition value additively comprises the output of a phase synchronization controller which takes the supply of the alternating current network through an auxiliary supply line into account.

According to a further development that is expedient in this respect, the difference between the set point auxiliary active power $P_{Aux,Soll}$ and the auxiliary power $P_{Aux}$ transmitted via the auxiliary supply line is formed, so obtaining an auxiliary active power difference value $\Delta P_{Aux}$, and the auxiliary active power difference value $\Delta P_{Aux}$ is supplied to the phase synchronization controller as an input magnitude. It is thus possible in the context of the invention to take into account a certain energy supply, and thus limited in its power, of the alternating current network from outside. This is, however, only possible according to the invention if the phase is available to the control process as a degree of freedom. Advantageously, therefore, the Park transformation that is otherwise usually used in the determination of the voltage space-vector and the current space-vector is omitted. According to the invention it is rather preferred to employ what is known as the discrete Fourier transform, DFT, and the inverse discrete Fourier transform, IDFT.

According to a further variant of the invention, the frequency pre-control regulator addition value additively comprises a compensation angle $\varphi_{KOMP}$ which compensates for the dead-time effects in the control loop of the converter. Taking dead-time effects into account increases the precision of the control.

Expediently a pre-control value obtained from the formula $$\underline{u}_{\to RE,VOR,\perp} = -j \cdot \frac{2}{3} \cdot \frac{P_{Soll} \cdot X_K}{|\underline{u}_{\to VP,1+}|}$$

is subtracted from the negative output of the orthogonal controller

Expediently the magnitude of the network voltage $\underline{u}_{\to VP}$ is added to the negative output of the parallel controller.

According to a further variant, the ascertained frequency value of the network voltage is added to the output value of the frequency controller.

According to a further variant, a supplementary set point value $C_Q*Q$, which results from the product of a specified reactive power parameter $C_Q$ and a reactive power Q ascertained from the network voltage $\underline{u}_{\to VP}$ and the converter current $\underline{i}_{\to RE}$, is subtracted from the frequency difference value $\Delta f$.

According to a further variant, a supplementary set point value $C_Q*|Q|$, which results from the product of a specified reactive power parameter $C_Q$ and a magnitude of the reactive power Q ascertained from the network voltage $\underline{u}_{\to VP}$ and the converter current $\underline{i}_{\to RE}$, is subtracted from the frequency difference value $\Delta f$.

Expediently, in the context of the invention, only the positive sequence part $\underline{u}_{\to VP,1+}$ of the fundamental oscillation is taken into account by the ascertained network voltage $\underline{u}_{\to VP}$. This greatly simplifies the control process.

In the context of the invention, the network voltage $\underline{u}_{\to VP}$ and the converter current $\underline{i}_{\to RE}$ are acquired with the aid of measuring sensors whose output signals are sampled so obtaining sampled values, and the sampled values are digitized, wherein an average is formed over sequential sampled values. The method according to the invention improved in this way is based on the acquisition of a voltage space-vector through suitable signal processing methods, for example with a discrete Fourier transform with an average value window whose window size is specified dynamically. Thus the number of sampled values and thereby, for example, the transmission length of the sliding average value window, is determined by the quotients of the sampling frequency and the network frequency. If, for example, the sampling frequency is 5 kHz and the reference frequency is 50 Hz, a transformation length, or in other words the number of sequential sampled values over which the averaging is performed, is 100. If, on the other hand, the network frequency is 51 Hz, the average is only made over 98 sampled values.

Further expedient embodiments and advantages of the invention are the object of the following description of exemplary embodiments, making reference to the figures of the drawing, wherein the same reference signs refer to components having the same effect.

DESCRIPTION OF THE INVENTION

Figure 1:
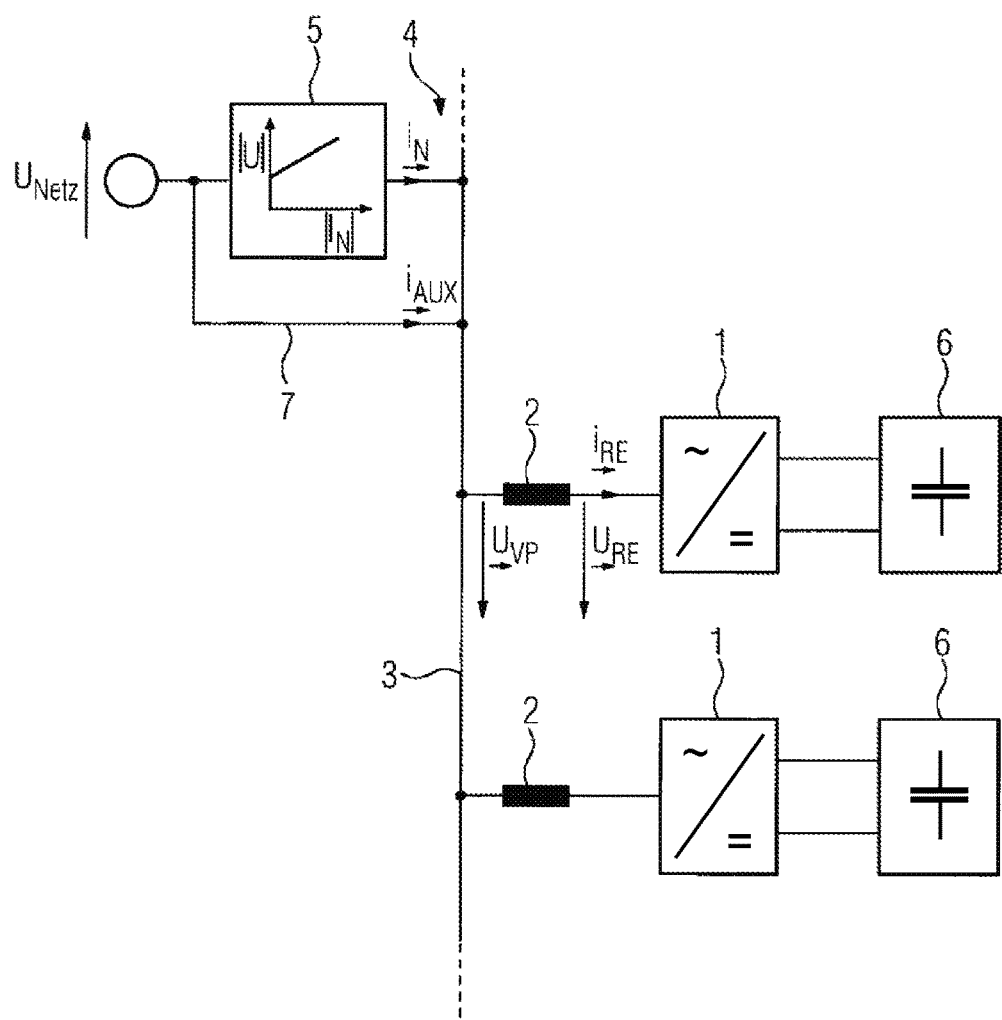
FIG. 1 illustrates a series of identically constructed converters which are each connected through an inductive component to an alternating current network, wherein the alternating current network is a weak alternating current network and exhibits a non-linear impedance.

FIG. 1 shows, in a schematic illustration, a series of self-commutated converters 1 connected via an inductive component 2 to a coupling point 3 of an alternating current network 4, whose impedance is shown in the diagram 5. It can be seen that initially no current I flows in the alternating current network 4, until the network voltage $\underline{u}_{\to VP}$ reaches a threshold voltage. The current then rises with increasing voltage, in this case linearly by way of example. Such a non-linear impedance reflects the behavior of an alternating current network which is connected via a direct current connection to the power supply network $U_{Netz}$, in which the direct current connection comprises a diode rectifier, not illustrated. The alternating current terminal of the diode rectifier is here connected to the alternating current network 4. The said diode rectifier is connected through its direct current terminals to an intermediate direct current circuit or to some other direct current network which in turn is connected through a further converter to the power supply network $U_{Netz}$. Such network topologies are used, for example, for the connection of a wind farm located in a sea or a lake. As a result of the direct current connection, the power generated by the wind farm can be transmitted even over long distances with low losses to the land-based stiff power supply network $U_{Netz}$.

Each self-commutated converter 1 is connected to an energy store 6, which can for example be the capacitor of an intermediate direct current circuit. In a preferred variant, the energy store 6 is part of an intermediate direct current circuit that is used for connection on the direct current side of the converter 1 to a further converter which is not illustrated in the drawing of FIG. 1. On its alternating current side, the converter that is not illustrated is connected to a generator which is, for example, part of a wind turbine. The kinetic energy obtained by the rotor blades of the wind turbine is then converted by the generator into electrical energy, and this energy is temporarily stored in the energy store 6. The method according to the invention makes it possible for the alternating current network 4 to be constructed with the desired frequency and amplitude, without a separate, independent energy source with sufficiently high power being required for this purpose. In the context of the invention it is, however, possible to take into account an auxiliary energy supply which is also shown in FIG. 1. This consists, for example, of a simple alternating current connection whose voltage, however, is limited to, for example, 60 kV. The alignment of the rotor blades of the wind turbines is, for example, possible with this. The set-up of an alternating current network by the auxiliary energy supply, to which the converter can easily synchronize, is no longer required in the context of the invention.

Figure 3:
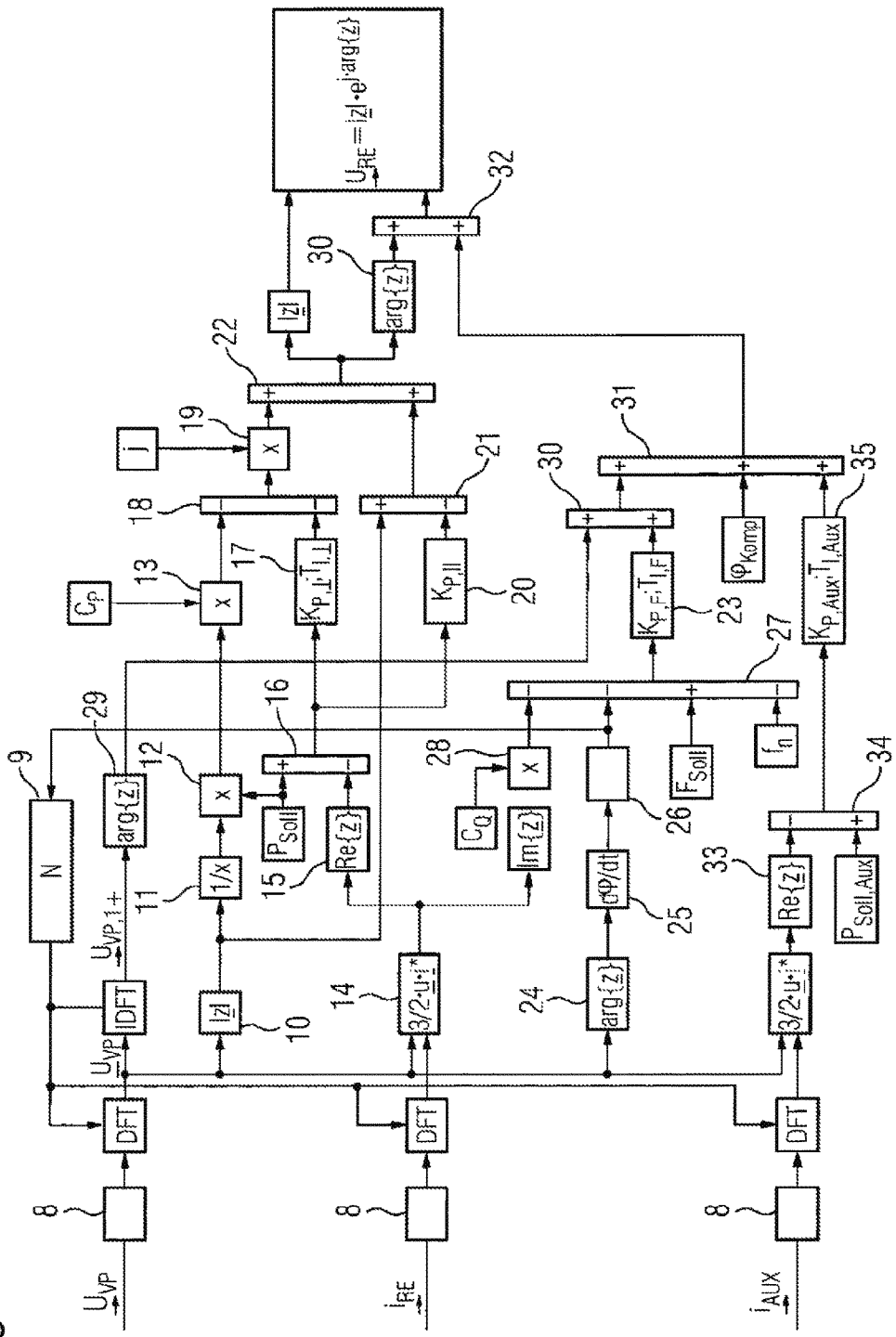
FIG. 3 illustrates the method according to the invention schematically.

In the exemplary embodiment of the invention shown schematically in FIG. 3, the network voltage $\underline{u}_{\rightarrow VP}$ is acquired with the aid of measuring sensors, wherein the alternating current network is multiphase. The space-vector of the network voltage at coupling point 3 is first ascertained, and subjected to a discrete Fourier transform (DFT). The space-vector of the network voltage is here represented in polar coordinates, resulting in $$\underline{u}_{\rightarrow VP,1+} = \underline{u}_{VP} \cdot e^{j \cdot 2\pi f_N \cdot t} \quad (1)$$

After the discrete Fourier transform, the complex amplitude of the said network voltage is determined as $|\underline{z}|$, and the phase, containing the frequency, of the network voltage is determined as $\arg\{\underline{z}\}$. In addition, the converter current $\underline{i}_{\rightarrow RE}$ flowing through the inductive component is acquired by measuring sensors that are arranged between the converter 1 and the inductive component 2. The third input magnitude is, in the exemplary embodiment of the method according to the invention illustrated, the auxiliary current $\underline{i}_{\rightarrow AUX}$ flowing through the auxiliary supply line 7.

All the input magnitudes are smoothed by a smoothing filter 8, and then supplied to the function block of said discrete Fourier transform (DFT). In the Fourier transform, an average is taken over N sampled values, where the number of the sampled values N, or in other words the magnitude of the averaging window, is kept variable, and is made dependent on the frequency prevailing at the time. This will be considered in more detail later.

The complex vector of the network voltage $\underline{u}_{\rightarrow VP}$ is used in order to determine both the phase as the angle argument $\arg\{\underline{z}\}$ and the amplitude $|\underline{z}|$.

The apparent power $S_{RE,VP}$ is determined on the basis of formula $$S_{RE,VP} = 3/2 \cdot \underline{u}_{\rightarrow VP} \cdot \underline{i}_{\rightarrow RE}{}^* = P_{RE,VP} + j \cdot Q_{RE,VP} \quad (2)$$

where $\underline{i}_{\rightarrow RE}$ corresponds to the converter current. The energy exchange of each control unit, that is of each converter 1 with the alternating current network 4 is generated by two components in the set point voltage space-vector $\underline{u}_{\rightarrow RE}$ of the respective converter. One of these components is a parallel component $\underline{u}_{\rightarrow RE,\parallel} = c_\parallel \cdot \underline{u}_{\rightarrow VP,1+}$. The orthogonal component $\underline{u}_{\rightarrow RE,\perp} = j \cdot c_\perp \cdot \underline{u}_{\rightarrow VP,1+}$ is perpendicular to the network voltage vector. In the context of the invention it is assumed that the coupling impedance $\underline{Z}_K$ of the inductive component 2 exhibits a primarily inductive component for the fundamental oscillation. This behavior can be represented by the formula $\underline{Z}_K = R_K + jX_K$ with $(X_K/R_K \gg 1)$. With $\underline{i}_{\rightarrow RE} = (\underline{u}_{\rightarrow VP} - \underline{u}_{\rightarrow RE})/\underline{Z}_K$, it follows, considering only the positive sequence, that:

$$S_{RE,VP,1+} = \frac{3}{2} \cdot |u_{VP,1+}|^2 \cdot \frac{[(1-c_\parallel) + j \cdot c_\perp] \cdot [R_K + j \cdot X_K]}{Z_K^2} \quad (3)$$

and thus, for the active power that defines the energy exchange:

$$P_{RE,VP,1+} = \frac{3}{2} \cdot \frac{|u_{VP,1+}|^2}{Z_K^2} \cdot [(1-c_\parallel) \cdot R_K - c_\perp \cdot X_K] \quad (4)$$

Considering the assumption made here of $X_K/R_K \gg 1$, it follows that:

$$P_{RE,VP,1+} = -\frac{3}{2} \cdot \frac{|u_{VP,1+}|^2}{X_K} \cdot c_\perp \quad (5)$$

Using the set point value for the active power $P_{Soll}$ as a pre-control value for the orthogonal component, this relationship is inserted into the set point voltage of the control unit:

$$\underline{u}_{RE,VOR,\perp} = -j \cdot \frac{2}{3} \cdot \frac{P_{Soll} \cdot X_K}{\left|\underline{u}_{VP,1+}\right|} \cdot \frac{\underline{u}_{VP,1+}}{\left|\underline{u}_{VP,1+}\right|} \quad (6)$$

In addition, a correction value for the purpose of compensating for inaccuracies for the orthogonal component is superimposed on the set point voltage of the control unit using the active power difference value $\Delta P$.

$$\underline{u}_{RE,KOR,\perp} = -j \cdot \left(K_{P,\perp} \cdot \Delta P + \frac{1}{T_{I,\perp}} \cdot \int \Delta P \cdot dt\right) \cdot \frac{\underline{u}_{VP,1+}}{\left|\underline{u}_{VP,1+}\right|} \quad (7)$$

These two orthogonal components only have a productive effect if an appropriate current results through interaction with the electrical network 4. Because of the non-linear impedance characteristic 5, this current does not necessarily arise. For this reason, the parallel component in the set point voltage of the control unit, that is the converter 1, is supplemented, in addition to the pre-control value $\underline{u}_{\rightarrow RE,VOR,\parallel} = C_\parallel \cdot \underline{u}_{\rightarrow VP,1+} = \underline{u}_{\rightarrow VP,1+}$ (with $C_{\parallel=1}$), which minimizes the reactive power at the coupling point, by a correction component which is proportional to the active power difference value $\Delta P$. This yields $$\underline{u}_{RE,\parallel} = \underline{u}_{RE,VOR,\parallel} + \underline{u}_{RE,KOR,\parallel} = \frac{\underline{u}_{VP,1+}}{\left|\underline{u}_{VP,1+}\right|} \cdot \left(\left|\underline{u}_{VP,1+}\right| - K_{P,\parallel} \cdot \Delta P\right) \quad (8)$$

The said correction value acts directly on the voltage magnitude at the coupling point through the strong feedback through the impedance divider that is formed by the coupling impedance $\underline{Z}_K$ and the network impedance $\underline{Z}_N$. For the case where $\underline{i}_{\rightarrow Aux} = 0$, it follows from two mesh cycles and equating the two mesh currents, that $(\underline{u}_{\rightarrow VP} - \underline{u}_{\rightarrow RE})/\underline{Z}_K = (\underline{u}_{\rightarrow N} - \underline{u}_{\rightarrow VP})/\underline{Z}_N$, and furthermore after substituting individual terms, that $$\underline{u}_{VP} = \frac{\underline{u}_{RE}}{1 + \underline{Z}_K/\underline{Z}_N} + \underline{u}_N \cdot \frac{\underline{Z}_K/\underline{Z}_N}{1 + \underline{Z}_K/\underline{Z}_N} = \underline{u}_{RE} \cdot \frac{\underline{Z}_N}{\underline{Z}_N + \underline{Z}_K} + \underline{u}_N \cdot \frac{\underline{Z}_K}{\underline{Z}_N + \underline{Z}_K}$$

The feedback from the component in $\underline{u}_{\rightarrow VP}$ caused by the impedance divider $$\frac{\underline{Z}_N}{\underline{Z}_N + \underline{Z}_K}$$

and $\underline{u}_{\rightarrow RE}$ through the acquisition of the voltage in the control unit becomes weaker as the network becomes stiffer, i.e. as the magnitude of $\underline{Z}_N$ becomes smaller. Thus, if $K_{P\|Soll>0}$, the voltage at the coupling point increases after $P_{Soll<0}$ has been specified due to the feedback through the averaging method of voltage acquisition described above.

FIG. 3 illustrates the relationships described above in a flow diagram corresponding to the control process. As already explained, the space-vector of the network voltage at the coupling point $\underline{u}_{VP}$, the converter current $\underline{i}_{RE}$ flowing through the respective inductive component 2 and, if relevant, a current $\underline{i}_{AUX}$ flowing through the auxiliary connecting line 7 are used as input magnitudes for the control process, wherein the respective space-vector is determined on the basis of measurements. The said input magnitudes are each smoothed in a smoothing filter 8, and then subjected to a discrete Fourier transform DFT. The output magnitude from the respective DFT function block can be understood as a complex vector which can be represented in Cartesian coordinates as follows: $\underline{z}_N = x+jy$. The magnitude is calculated according to $|\underline{z}| = \sqrt{x^2+y^2}$. The angle that the vector encloses with the x-axis with reference to the origin is $$\arg\{z\} = a\tan\left(\frac{x}{y}\right).$$

The magnitude of the network voltage is determined in this way for example from the complex vector of the network voltage $\underline{u}_{VP}$ using an absolute value generator 10, and a reciprocal generator 11 calculates the reciprocal value of the magnitude of the network voltage. The said reciprocal value is multiplied by a multiplier 12 with the set point value of the active power $P_{Soll}$, and then multiplied by the parameter $C_P$ by means of multiplier 13, so that a value according to formula (6) results. The term $$\frac{\underline{u}_{VP,1+}}{|\underline{u}_{VP,1+}|}$$

in formula 6 corresponds to a value on the unit circle that is to a pure angle that does not have to be considered at this point in the control process.

An apparent power calculation unit 14 provides an output signal that corresponds to the apparent power being exchanged through the respective inductive component 2, wherein the complex vector of the network voltage $\underline{u}_{VP}$ and the conjugated complex component of the complex vector of the converter current $\underline{i}_{RE}$ serve as input magnitudes for the apparent power calculation unit. The two values are multiplied together, after which they are multiplied by the factor 3/2. At its output, the apparent power calculation unit 14 is connected to a real component generator 15, which determines the real component of the apparent power, which is to say the active power Pi, and at its output provides a signal that corresponds to the active power P exchanged through the inductive component 2. The adder 16 calculates the active power difference ΔP as the difference P between the set point active power $P_{Soll}$ entered from an external location and the said actual active power P, where ΔP is the input magnitude for the PI controller 17. At the output of the PI controller, therefore, a signal is provided corresponding to formula (7).

The negative value of the PI controller (17) and the negative value of the multiplier (13) are added together in the adder 18, where the multiplier 19 induces a rotation through 90 degrees through multiplication with j, so that the output value of the multiplier corresponds to the desired orthogonal value which is oriented perpendicular to the vector of the network voltage. The negative values only result from the selection of the reference current for $\underline{i}_{RE}$ in FIG. 1, and are reversed if the reference arrow is turned through 180°.

A parallel controller 20 is also provided, and this is a proportional controller. The active power difference ΔP acts as an input magnitude for the parallel controller 20, where the output value of the parallel controller 20 is subtracted from a pre-control value, namely the magnitude of the network voltage $\underline{u}_{VP}$ according to formula (8) by the adder 21. The difference formation turns into a sum formation if the direction of the reference current for $\underline{i}_{RE}$ in FIG. 1 is reversed.

Figure 2:
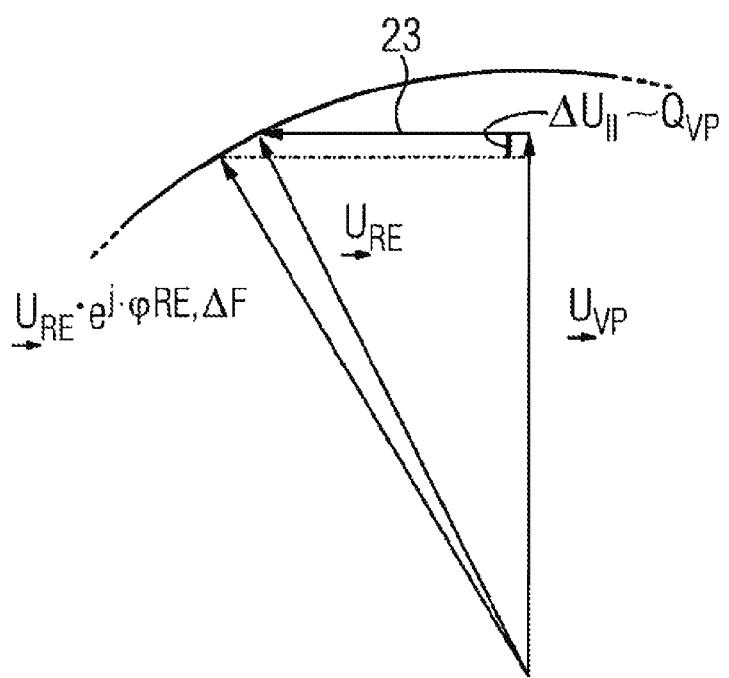
FIG. 2 shows a vector illustration of the effect and the mode of operation of the frequency controller and of the orthogonal controller.

The output signals of the multiplier 19 and the adder 21 are added together by the adder 22, resulting in a complex vector $\underline{u}_{RE}$ which is represented in a vector diagram in FIG. 2. As already explained, the parallel component corresponds as accurately as possible to the vector of the network voltage $\underline{u}_{VP}$, wherein the orthogonal component, which is marked with reference sign 23 in FIG. 2, substantially contributes to determining the amplitude of the set point voltage space-vector $\underline{u}_{RE}$.

In addition to setting the amplitude of the network voltage $\underline{u}_{VP}$, the method according to the invention also however regulates the frequency of the network voltage space-vector $\underline{u}_{VP}$, wherein a frequency controller 23 is used, once again being a PI controller. The change in the network frequency is thus determined from the space-vector of the network voltage $\underline{u}_{VP}$ by the argument generator 24 and the arrestor component 25, downstream of which a smoothing filter 26 is connected. With the aid of the frequency change, the transformation length N for averaging the DFT, and the inverse discrete Fourier transform IDFT is specified in the averaging window generator 9. The frequency change, and a specified nominal frequency $f_n$, are subtracted in the adder 27 from a set point frequency value $F_{Soll}$. $f_n$ is, for example, 50 Hz or 60 Hz.

As a pre-control value, the imaginary component of the apparent power is multiplied by the multiplier 28 with a system parameter $C_Q$, where the said product is also subtracted from the set point frequency value. Alternatively, the magnitude of the imaginary component of the apparent power can also be multiplied with a system parameter $C_Q$. The output of the adder 27 serves as an input magnitude for the frequency controller 23, so that an additional angle of rotation results as an output value according to the formula $$\varphi_{RE,\Delta F} = K_{P,F} \cdot \Delta F + \frac{1}{T_{I,F}} \cdot \int \Delta F \cdot dt \qquad (9)$$

and is added to the output of the argument generator 29 by an adding process in the adder 30. A compensation angle $\varphi_{KOMP}$ is added by the adder 31 to the output value of the adder 30, from which an additional angle of rotation ΔF results, which is added by means of the adder 32 to the angle of the amplitude controller.

The effect of the frequency control is illustrated schematically in FIG. 2. The frequency control effects a rotation of the converter voltage $\underline{u}_{RE}$ provided by the converter, to $\underline{u}_{RE} * e^{(j\varphi_{RE}, \Delta F)}$. The projection of $\underline{u}_{RE} * e^{(j\varphi_{RE}, \Delta F)}$ onto the vector of the network voltage $\underline{u}_{VP}$ is smaller than the projection of $\underline{u}_{RE}$ onto $\underline{u}_{VP}$, so that a change in the parallel voltage |Δu| results, corresponding largely to the reactive power $Q_{VP}$ exchanged through the inductive component 2.

The rotation of the set point voltage space-vector $\underline{u}_{RE}$ therefore has the effect of changing the reactive power $Q_{VP}$. For this reason the stabilization of the frequency control of each control unit, particularly in multiple operation, can be achieved through a correction of the set point value $F_{Soll}$ by means of a component depending on $Q_{VP}$ or alternatively on $Q_{VP}$.

The frequency control defines the phase of the voltage up to a constant value $\varphi_0$. This degree of freedom can be used in order to fulfill an additional control task, for example the provision of active power at the connecting point 3 through an additional auxiliary connection 7, wherein the auxiliary active power $P_{Aux}$ that is provided yields the real component (Re) of the auxiliary apparent power $S_{Aux}$, which is calculated according to $S_{Aux} = 3/2 \{\underline{u}_{VP} \cdot \underline{i}_{Aux} *\}$. The auxiliary active power value $P_{Aux}$ corresponds to the output signal from the real component generator 33. At the output of the adder 34, a signal thus results that corresponds to $\Delta P_{Aux} = P_{Soll,Aux} - P_{Aux} \cdot P_{Soll,Aux}$ is a set point magnitude for the control process specified by any desired location, originating for example from a central control of the wind farm, and is also known as the "park pilot". This signal $\Delta P_{Aux}$ is supplied to a phase synchronization controller 35, which generates at its output a signal corresponding to the formula $$\varphi_{RE,Aux} = K_{P,Aux} \cdot \Delta P_{Aux} + \frac{1}{T_{I,Aux}} \cdot \int \Delta P_{Aux} \cdot dt \qquad (10)$$

This output signal is supplied to the adder 31, and thus also added to the frequency controller output signal.

Figure 4:
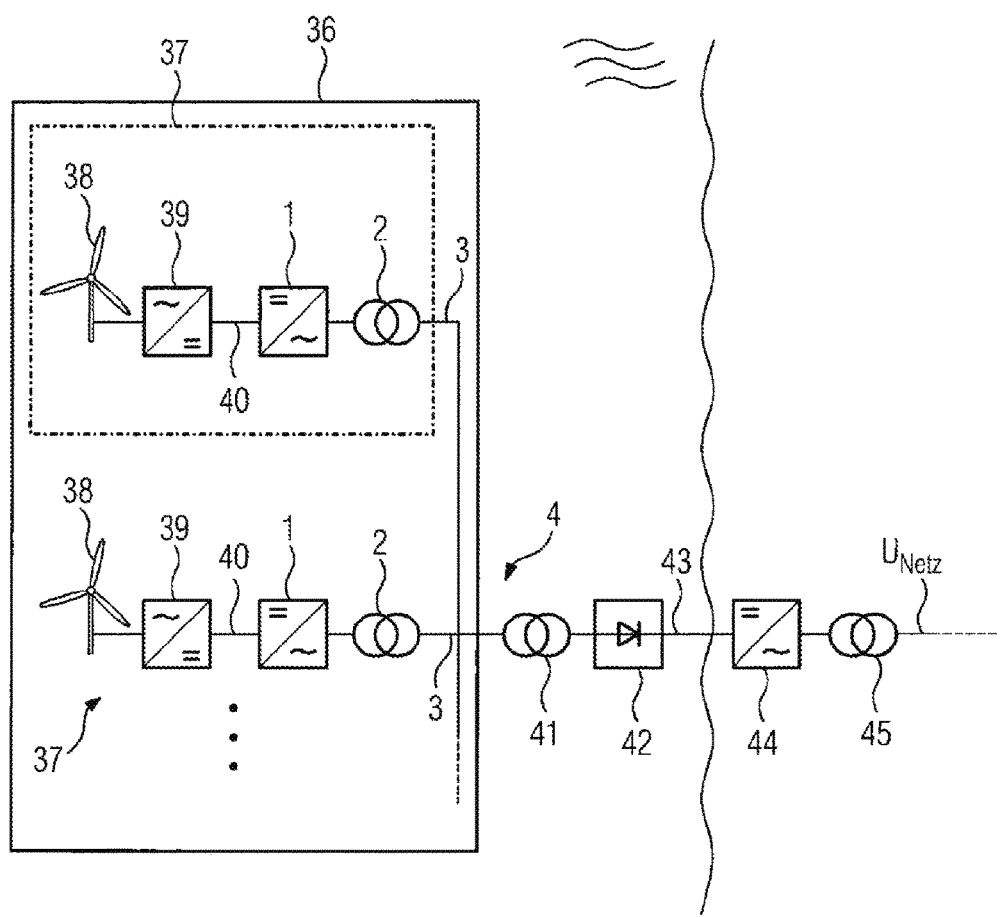
FIG. 4 shows schematically an exemplary embodiment of the wind farm according to the invention and of the self-commutated converter according to the invention.

FIG. 4 shows an exemplary embodiment of the wind farm 36 according to the invention that is designed to generate electrical power through the effect of the wind. As is indicated by the three wavy lines in the diagram, the wind farm 36 illustrated there is arranged in a lake or a sea, and incorporates a plurality of wind turbines 37, each of which is fitted with a rotor comprising rotor blades 38, which is set into rotation by the wind. The rotation of the rotor blades 38 is passed to a generator, not illustrated in the diagram, which provides an alternating current at its output. The generator is connected to a converter 39 that acts as a rectifier and which is connected on the direct current side to the self-commutated converter 1 according to the invention as a control unit for the method according to the invention. The direct current connection 40 that extends between the converters 1 and 39 is fitted with the energy store 6 mentioned above but not illustrated here in the figure. The voltage dropped across the energy store 6 is regulated by the converter 39 in the usual manner known to the expert. Each self-commutated converter 1 is connected through a transformer, which can be understood as an inductance 2, to the offshore alternating current network 4. The voltage and frequency of the alternating current network 4 are set by the control method according to the invention. The voltage here lies advantageously in the medium voltage range (1 kV to 50 kV). The alternating current network 4 is connected through a further transformer 41 to the diode rectifier 42. This is arranged offshore, close to the wind farm 36. The high-voltage transformer 41 generates a high-voltage alternating current of a few hundred kilovolts. The diode rectifier 42 is part of a direct current connection that comprises an intermediate direct current circuit 43 as well as a converter 44 arranged onshore. The converter 44 is connected through a transformer 45 to the onshore power supply network. The installation as a whole can comprise further assemblies not shown here, such as chokes, filters, protective equipment, switches or switching equipment. Advantageously the converters 1 and 39 are arranged together in a nacelle of the respective wind turbine 37.

The invention claimed is:

1. A method for controlling a first self-commutated converter, which is connected to a plurality of second self-commutated converters through an AC terminal thereof and via an inductive component at a coupling point of an alternating current network that is common to all converters, the method comprising:
   determining an active power P and a frequency $f_N$ from a network voltage $\underline{u}_{VP}$ ascertained at the coupling point and a converter current $\underline{i}_{RE}$ flowing through the inductive component;
   forming a difference between the active power P and a specified set point active power $P_{soll}$ to obtain an active power difference value ΔP; and
   forming a difference between the frequency $f_N$ and a specified set point frequency $F_{soll}$ to obtain a frequency difference value Δf;
   supplying the active power difference value ΔP to an orthogonal controller and to a parallel controller; and
   determining an active power exchanged between the first self-commutated converter and the coupling point from an output value of the orthogonal controller, and minimizing a reactive power exchanged between the converter and the coupling point with an output value of the parallel controller;
   supplying the frequency difference value Δf to a frequency controller, and combining an output value of the frequency controller with the output value of the orthogonal controller and the output value of the parallel controller, and at the same time minimizing frequency difference value Δf.

2. The method according to claim 1, which further comprises adding a pre-control value to the output value of the orthogonal controller and/or to the output value of the parallel controller and/or to the output value of the frequency controller to thereby obtain an orthogonal pre-control regulator addition value, a parallel pre-control regulator addition value and/or a frequency pre-control regulator addition value, respectively.

3. The method according to claim 2, which further comprises additively combining the orthogonal pre-control regulator addition value multiplied by j with the parallel pre-control regulator addition value to form an additive combination, and ascertaining an amplitude |z| and a pre-phase of a converter voltage $\underline{u}_{RE} = |z| \cdot e^{j \arg\{z\}}$ from the additive combination, corresponding to a converter voltage that provides for a transmission of the active power P that corresponds as closely as possible to the specified set point active power $P_{soll}$, and with which the reactive power is minimized.

4. The method according to claim 3, which comprises additively combining the frequency pre-control regulator addition value with the pre-phase, to thereby obtain a phase of a converter voltage to be set.

5. The method according to claim 4, wherein the frequency pre-control regulator addition value additively includes an output of a phase synchronization controller which takes into account a supply of the alternating current network through an auxiliary supply line.

6. The method according to claim 5, which comprises forming a difference between a set point auxiliary active power $P_{Aux,soll}$ and an auxiliary active power $P_{Aux}$ transmitted via the auxiliary supply line, to thereby obtain an auxiliary active power difference value $\Delta P_{Aux}$, and supplying the auxiliary active power difference value $\Delta P_{Aux}$ to the phase synchronization controller as an input.

7. The method according to claim 4, wherein the frequency pre-control regulator addition value additively comprises a compensation angle $\varphi_{KOMP}$ that compensates for dead-time effects in a control loop of the first self-commutated converter.

8. The method according to claim 2, which comprises subtracting a pre-control value obtained from a formula $$\underline{u}_{RE,VOR,\perp} = -j \cdot \frac{2}{3} \cdot \frac{P_{Soll} \cdot X_K}{|\underline{u}_{VP,1+}|}$$

from a negative output of the orthogonal controller.

9. The method according to claim 2, which comprises adding a magnitude of the network voltage $|\underline{u}_{VP}|$, or, if a current reference vector for $\underline{i}_{RE}$ faces in an opposite direction, positive output of the parallel controller, to a negative output of the parallel controller.

10. The method according to claim 2, which comprises adding a frequency value of the network voltage $\underline{u}_{VP}$, as a pre-control value to the output value of the frequency controller.

11. The method according to claim 1, which comprises subtracting a supplementary set point value $C_Q*Q$, which results from a product of a specified reactive power parameter $C_Q$ and a reactive power Q or a magnitude |Q| thereof ascertained from the network voltage $\underline{u}_{VP}$ and the converter current $\underline{i}_{RE}$ from the frequency difference value $\Delta f$.

12. The method according to claim 1, which comprises taking into account only a positive sequence part of a fundamental oscillation by the network voltage $\underline{u}_{VP}$.

13. The method according to claim 1, which comprises acquiring the network voltage $\underline{u}_{VP}$ and the converter current $\underline{i}_{RE}$ by way of measuring sensors, sampling output signals thereof to obtain sampled values, and digitizing the sampled values, and forming an average over sequential N digitized sampled values.

14. The method according to claim 1, wherein the alternating current network is connected through a direct current connection to a power supply network $U_{Netz}$ comprising an energy source, wherein the direct current connection comprises a diode rectifier that is connected via the direct current connection to a further converter which is connected to the power supply network $U_{Netz}$.

15. A self-commutated converter for transmitting a power, the converter comprising:
   an alternating current terminal for connecting a high-voltage AC electrical network;
   a direct current terminal for connecting a direct current network; and
   a control unit connected to power semiconductor switches to be switched on or off, said control unit being configured to adjust a transmission of the power by carrying out the method according to claim 1.

16. A wind farm, comprising a multiplicity of wind turbines, each of said wind turbines including the self-commutated converter according to claim 15 configured for connection to the alternating current network.

17. The wind farm according to claim 16, wherein said self-commutated converters are connected via the alternating current network and via a direct current connection to a power supply network comprising an energy source, wherein the direct current connection includes a diode rectifier connected via a direct current network to a further converter that is connected to the power supply network $U_{Netz}$.

* * * * *